United States Patent
Gimpelson et al.

(10) Patent No.: US 6,756,534 B2
(45) Date of Patent: Jun. 29, 2004

(54) MUSIC PUZZLE PLATFORM

(75) Inventors: Alexander Gimpelson, Cambridge, MA (US); Mirek Nisenbaum, New York, NY (US); Igor Tkachenko, Allston, MA (US); Roman Yakub, Amherst, MA (US)

(73) Assignee: Quaint Interactive, Inc., Cambridge, MA (US)

( * ) Notice: Subject to any disclaimer, the term of this patent is extended or adjusted under 35 U.S.C. 154(b) by 0 days.

(21) Appl. No.: 10/216,068

(22) Filed: Aug. 8, 2002

(65) Prior Publication Data

US 2003/0079599 A1 May 1, 2003

Related U.S. Application Data

(60) Provisional application No. 60/315,236, filed on Aug. 27, 2001.

(51) Int. Cl.[7] .............................. G10H 1/38; G10H 7/00
(52) U.S. Cl. .............................. 84/610; 84/609; 84/615; 84/634; 84/649; 84/650; 84/653; 84/666
(58) Field of Search .................. 84/600–604, 609–619, 84/615–616, 622–625, 634, 649–654, 666, 477 R (56) References Cited

U.S. PATENT DOCUMENTS

| | | | |
|---|---|---|---|
| 3,823,637 A | | 7/1974 | Scott |
| 4,386,551 A | | 6/1983 | Morgando |
| 5,496,179 A | | 3/1996 | Hoffman |
| 5,663,517 A | * | 9/1997 | Oppenheim ................... 84/649 |
| 6,211,453 B1 | * | 4/2001 | Kurakake ...................... 84/609 |
| 6,281,421 B1 | * | 8/2001 | Kawaguchi .................... 84/603 |
| 6,384,310 B2 | * | 5/2002 | Aoki et al. .................... 84/609 |
| 6,635,816 B2 | * | 10/2003 | Funaki ....................... 84/477 R |

* cited by examiner

*Primary Examiner*—Marlon T. Fletcher
(74) *Attorney, Agent, or Firm*—Hamilton, Brook, Smith & Reynolds, P.C.

(57) ABSTRACT

The present invention relates to a way of presenting a musical composition such as an orchestral piece, a song, jingle, or other musical content (complete or excerpts) as a sort of game made up of component audio tracks. In one preferred embodiment, the individual tracks are defined by layers (also called "segments") that represent different instruments. For example, in the case of an orchestral music, the layers may represent the sounds made by a violin, flute, trumpet, drum, piano, and so on. The separate digital recordings of each layer then are the audio tracks that become pieces of a puzzle.

5 Claims, 9 Drawing Sheets

MUSIC PUZZLE PLATFORM

RELATED APPLICATION(S)

This application claims the benefit of U.S. Provisional Application No. 60/315,236, filed on Aug. 27, 2001. The entire teachings of the above application are incorporated herein by reference.

BACKGROUND OF THE INVENTION

The present invention relates to a framework for creating interactive games and other entertainment from musical content.

It is well established that experts in childhood development and related fields have repeatedly shown that music can have a significant positive impact on intellectual development. Early exposure to music has be linked to improved performance in learning to read as well as in mathematical and symbolic thinking skills.

It comes as no surprise then that a number of toys have been developed to encourage children to engage in musical play. For example, U.S. Pat. No. 6,353,168 issued to Sosoka et al. describes a type of musical toy that allows one or more music sequences to be selected and played. The toy includes a base unit and associated blocks that are configured to be inserted into receiving portions in the base. When the blocks are engaged with the receiving portions a musical sequence is played by the toy according to the arrangement of the blocks. The particular sequence played by the toy depends upon which face of the block is engaged with the receiving portion.

Also of interest is U.S. Pat. No. 6,366,758 issued to Dunn et al. This patent describes a toy in which a number of buttons are positioned on the outward faces of a housing such as a cube. The buttons correspond to component parts of a prearranged musical composition. For example, each button may represent may have a graphical representation of a musical instrument in the composition. In operation each button blinks in synchronization with notes being played by an instrument for as long as the instrument is included in the selected ensemble. This permits a child to appreciate the various components of a composition as represented by particular musical instruments.

However, neither of these toys introduces any notion of solving a musical jigsaw puzzle. For example, they do not present a goal/winning or correct selection combination paradigm.

SUMMARY OF THE INVENTION

The present invention is a framework for the creation of interactive entertainment using musical content as a source. The resulting game can be played on any data processor. In general, the source musical content is first broken down into the "layers" or "segments". It uses segmenting (i.e., splitting by layer) of source music content, where a layer can include (a) one or more instruments (b) one or more voices; (c) one or more synthesized timbres or d) any combination of the foregoing. The source layers are then combined with an additional set of "distractor" layers that sound similar to the original layers, but which are "incorrect". The game is then devised using both the original correct layers and distractor layers by requiring a player to select and then arrange them in a particular manner. The game is "won" when the layers are selected correctly.

The technique can be applied to the creation of products such as computer games, either PC-based or handheld, interactive video games, board games, advertisements or consumer media such as those that are available on web portals or digital cable television devices.

Applications of the basic techniques of the invention can take a number of forms. For example, in a preferred embodiment a puzzle type game is created whereby the player is required to select from among a set of available correct layers and incorrect "altered" musical layers. Upon selecting a limited number of the available layers, such as indicated by instruments representing each of one of several tracks of an original musical score, a selected combination is played. The user "wins" the game when only the correct layers corresponding to the original musical score are selected.

Layers may be manipulated in various fashions such as by selecting a graphical representation of each audio track assigned to a layer. This can for example, be indicated by a graphical depiction of the musical instruments that represents the track. Layers may also be selected in other ways such as by interacting with animated characters, as might be appropriate in games designed for very young children.

Any type of musical content can be used in the framework, this includes but is not limited to a recorded musical performance, electronically produced music using MIDI or other sequencing technologies, or based upon musical scores or other written representations of music.

For example orchestral compositions can be split up according to the score for each particular instrument or section of instruments or voices.

It should also be understood that music can be divided into layers either before or after it is recorded. For example, the process of segmentation into layers can be determined based upon one version of the music i.e., based upon its written score, while the segments themselves are produced from another version, i.e., from a recorded performance.

The altered or incorrect "distractor" layers can be created in a number of ways. These additional layers may be created in a form which is similar to the correct segments but not exactly in the same. These pieces may or may not fit musically with other puzzle pieces. The incorrect pieces taken separately may make up a completely different musical entity that is they might be parts of another complete musical composition.

Finally the integration of layers may be presented in a number of ways. For example, it is typically possible for the layers to be played back in a synchronized fashion that is upon selecting a subset of layers the user is permitted to hear a recreation of the music that represents the selected layers. Visual elements may also be provided to allow the player select a range or otherwise manipulate the layers. These can take the form of buttons, animated characters, instrument icons, blocks, switches or other graphical interface elements.

The key point here is that the puzzle is based upon musical rather than visual material. Unlike other puzzles there is introduced a distractor element that consists of incorrect altered segments. That is there are a certain number of layers which are not relevant to the correct assembly of musical segments to solve the puzzle.

The result is thus a goal oriented activity whereby the correct assembly of music parts is encouraged.

Because the musical puzzle provides for a number of alternative or incorrect assemblies or arrangement of layers, it can provide other forms on entertainment. For example, each incorrect assembly still provides the game player with experience in hearing the effect of selecting different musical tracks, allowing them to explore the different musical combinations.

Furthermore, the puzzles allow a player to the flexibility to develop an arrangement or assembly of segments as a creative act. That is the player may develop other goals for arrangements or assemblies of segments.

The invention may be implemented on any data processor enabled device that has audio capability. For example, the music puzzle can be implemented using any computer hardware with mixing and/or sequencing sound, the playing back of stored and computing sounds and is capable of providing a user interface to allow a user to change the arrangement or assembly of sounds. This typically occurs on a standard personal computer platform via the use of a mouse, keyboard, joy stick and associated speaker and audio hardware and software. However, other platforms such as that including special purpose electronics hardware and switches, buttons and audio equipment may be used to implement the game.

While distribution channels for the invention are envisioned in the form of individually purchased copies of personal computer software such as distributed on CD Rom or downloaded onto a hard disk. The invention can also be implemented using an online connection either selecting puzzles from an available set or receiving it through various programming distribution formats such as Java™ or Flash™ animation.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention relates to a way of presenting a musical composition such as an orchestral piece, a song, jingle, or other musical content (complete or excerpts) as a sort of game made up of component audio tracks. In one preferred embodiment, the individual tracks are defined by layers (also called "segments") that represent different instruments. For example, in the case of an orchestral music, the layers may represent the sounds made by a violin, flute, trumpet, drum, piano, and so on. The separate digital recordings of each layer then are the audio tracks that become pieces of a puzzle.

The player then has an object in the game to assemble and create the original music expression. A challenge to the player comes in that a variety of incorrect or alternate tracks are also presented for selection. For example, an alternate track might be presented by an instrument that is not actually part of the original composition. It becomes the goal of the game for the player to create the original music expression correctly, by selecting only the appropriate original tracks, and without selecting any of the alternate tracks.

One particular implementation of the game will be now described in connection with FIG. 1—the reader may also find it of interest to also refer to the screen shots of FIGS. 2–4 in the following description. In this embodiment the invention was implemented using a particular multimedia application environment for personal computers known as Flash™, which is a product of Macromedia, Inc. of San Francisco, Calif. While this implementation of the invention was thus meant for operation on a general purpose personal computer, it should be understood that the invention can also be implemented in other devices such as handheld games, media players, a special purpose video game or in other ways.

Figure 1:
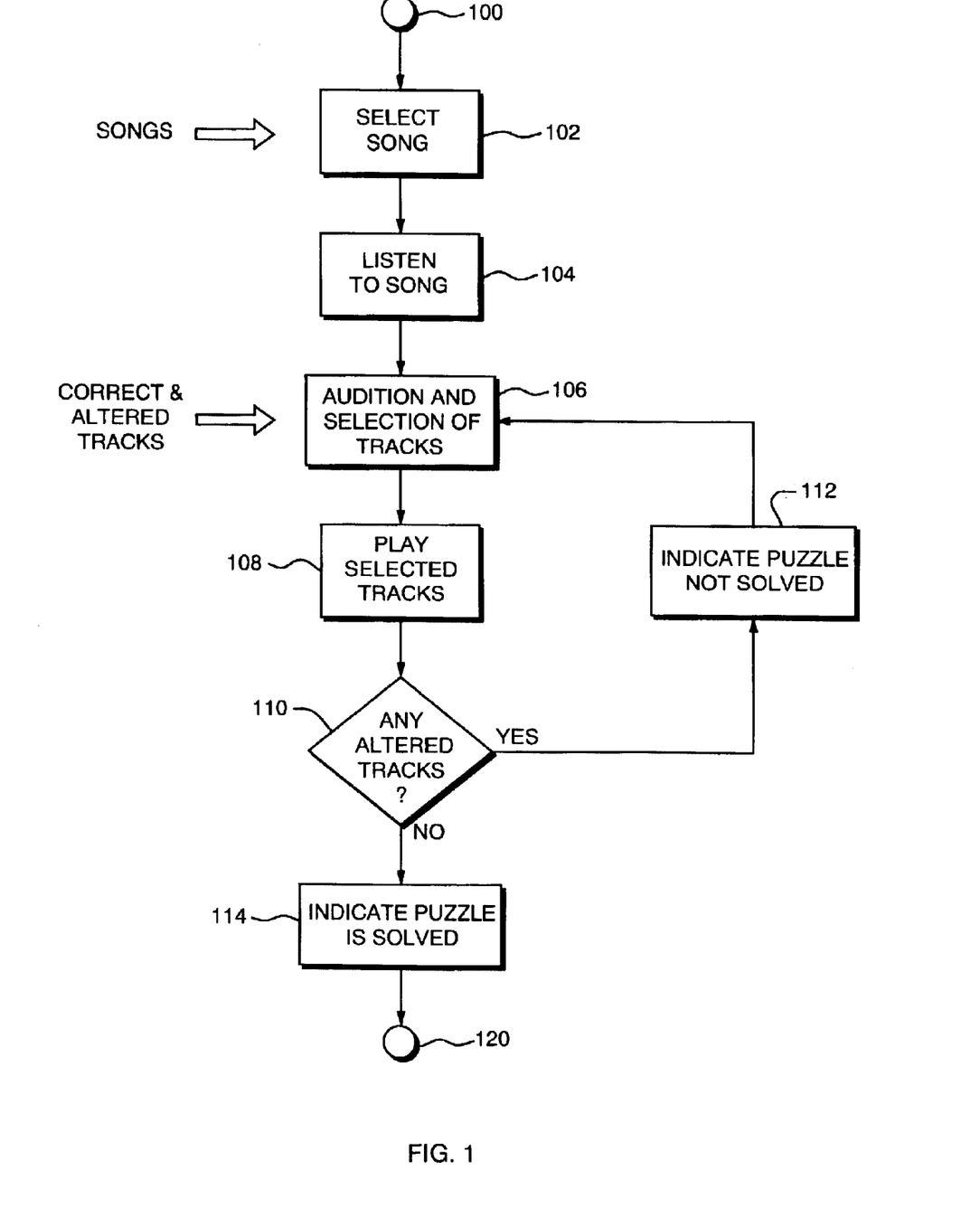
FIG. 1 is a flow diagram of a sequence of steps performed by a processor that implements a music puzzle game according to the invention.
Figure 2:
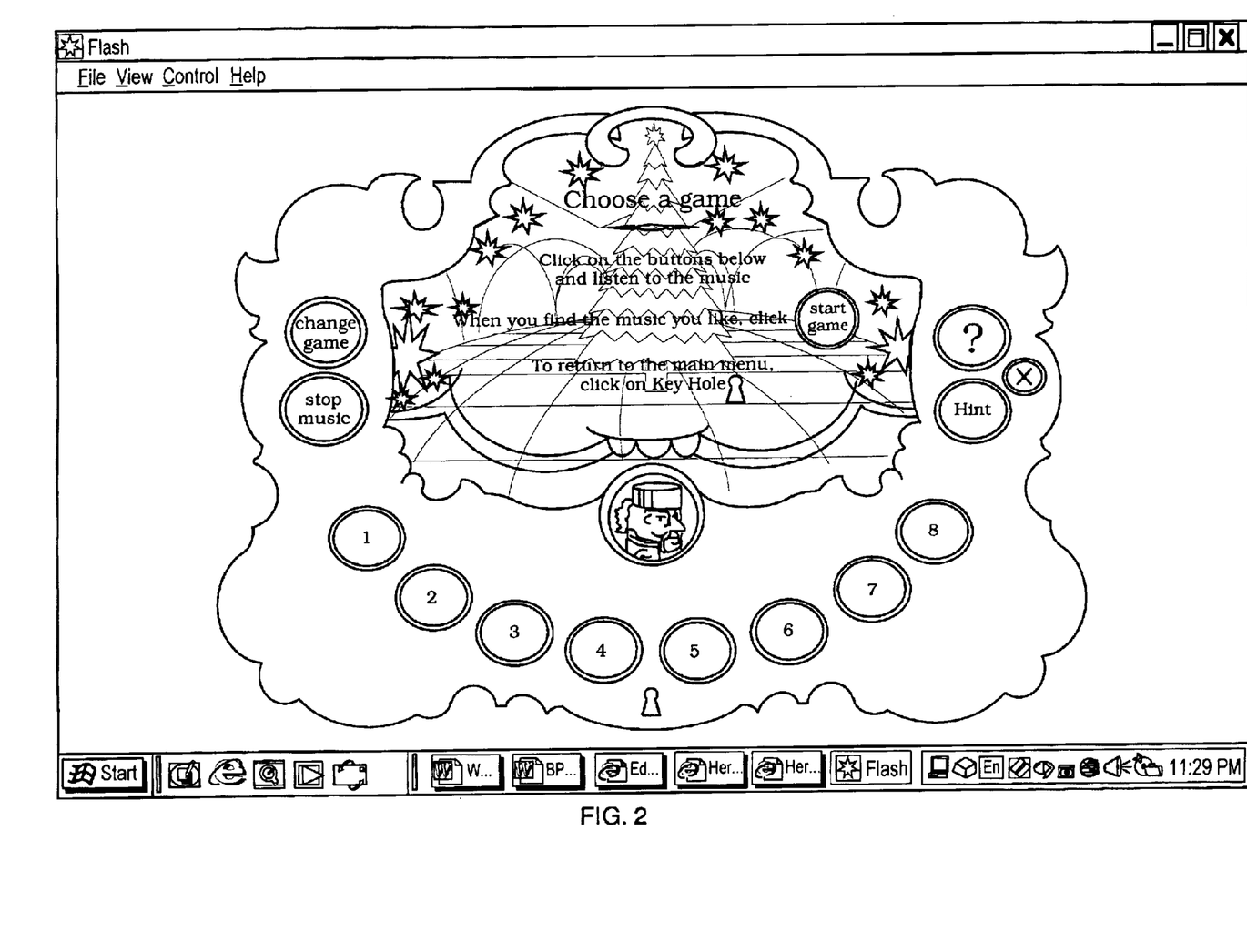
FIG. 2 is a screen shot of one state of the game.

Now turning attention to FIG. 1 and the accompanying screen shots, from an initial state 100 a menu state 102 is entered in which the user is prompted to select a song. The piece of music may be selected from part of a menu as shown in FIG. 2. In this particular case, the player is permitted to select from among eight songs, each represented by a number button. The desired music puzzle is selected by selecting one of the corresponding buttons. In the case of illustrated embodiment, the game is based upon music from Tchaikovsky's Nutcracker Ballet.

After selecting a piece of music for the game, in a preview state 104 the system then allows the player to listen to the selected song prior to the game actually beginning. In the next state 106 a set of musical tracks from which the user will select during participation in the game is revealed.

Figure 3:
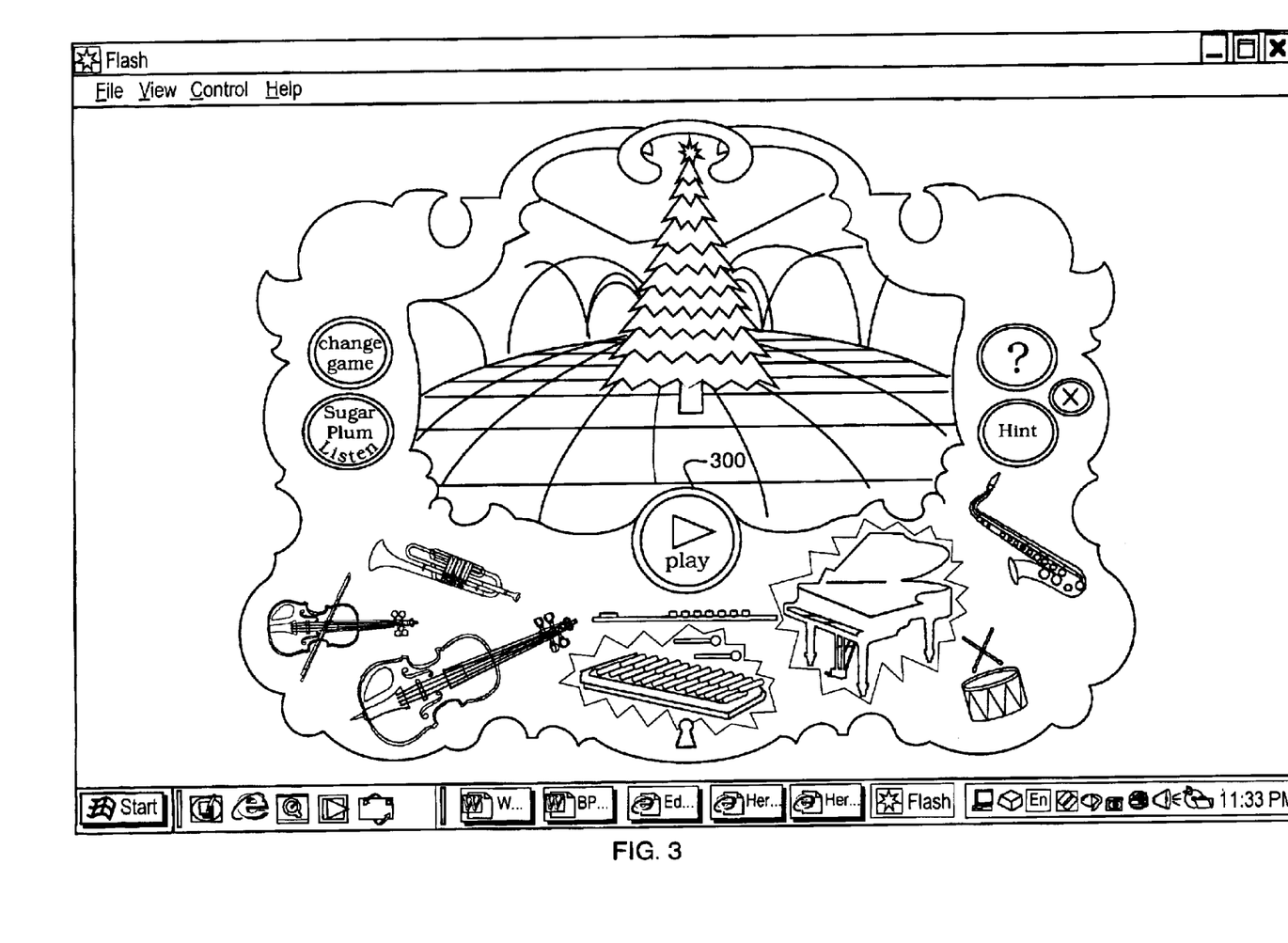
FIG. 3 is another screen shot showing a point at which the user selects tracks.

As shown in FIG. 3 and in connection with state 106, the user is then presented with a menu that permits selecting from among eight possible tracks or segments. Each track here corresponds to a particular instrument that is associated with the chosen song. In this particular example there are four correct tracks; that is, four tracks actually belong in the song. There are in addition four incorrect tracks that do not belong in the song, but it should be understood that this basic concept can be extended to include any number of correct and incorrect tracks.

In this particular example icons are presented for each of the various tracks where each icon is associated with a particular instrument. For example, in FIG. 3 the eight instrument icons represent tracks that have a trumpet, violin, viola, flute, xylophone, piano, drum and saxophone. A particular selected piece of music in this example may thus have correct tracks representing the flute, violin, piano and drum. Incorrect tracks may be presented that represent the trumpet, viola, xylophone, and saxophone.

At this menu, in state 106 the player may also audition instruments individually such as by clicking on the representative icon for each instrument.

Additionally the user may move an instrument icon to the stage area. Instruments moved to the stage area will play together when the "play" icon is selected. According with the desires of the game designer, the playing instrument may or may not be animated when played.

In state 108, once the user selects a number of tracks/instruments he or she may listen to the composition by pressing the play button 300, testing his hypothesis for solving the puzzle. Additional animation may be introduced at this point; in the illustrated game base on the Nutcracker, animated characters for Drosselmeyer and Clara dance on the stage when the user selects the play button 300.

Figure 4:
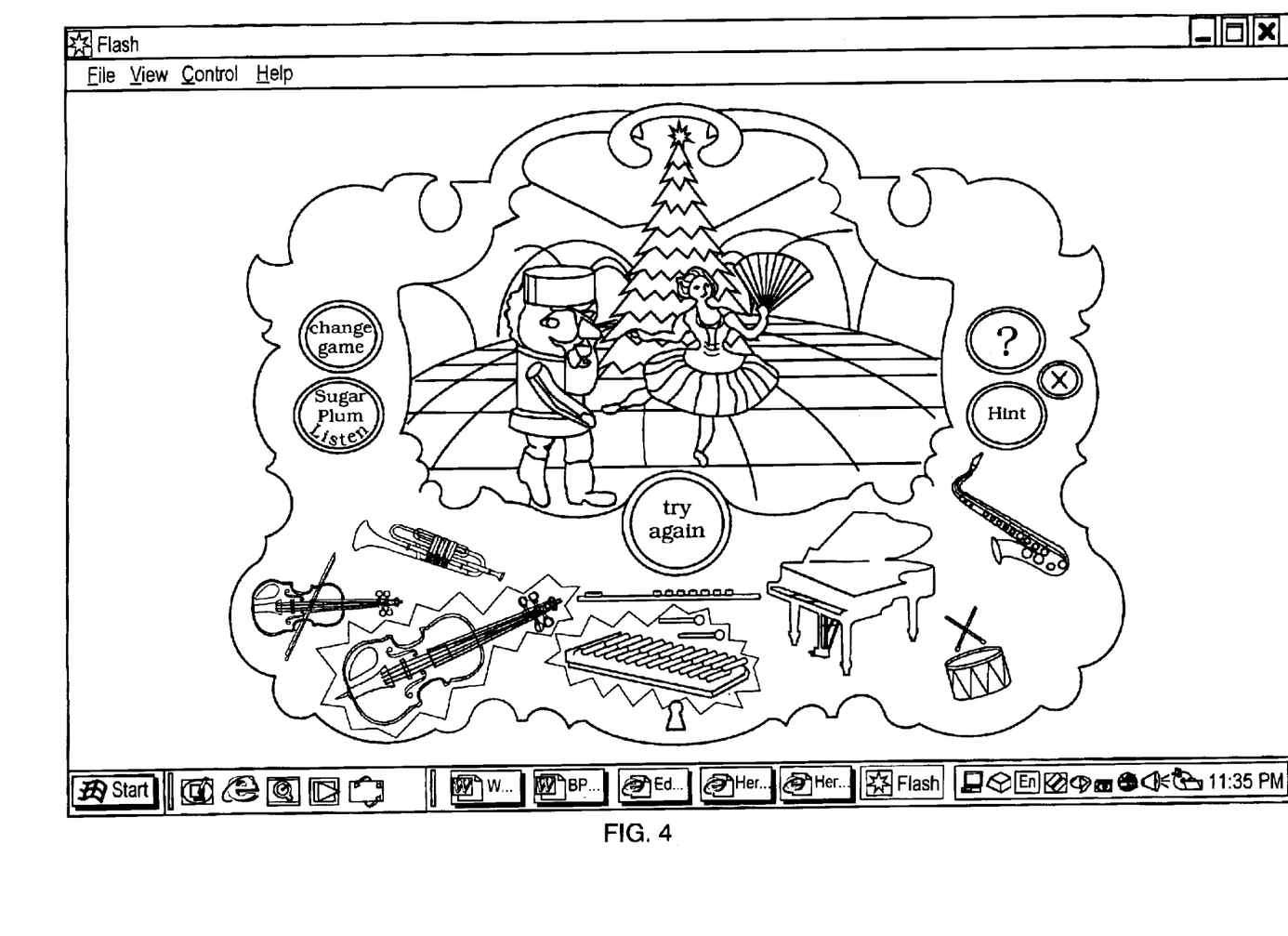
FIG. 4 is a screen shot showing the result when the user selects both correct and alter tracks.

When an incorrect track (e.g., at least one altered track) has been selected by the user, then state 112 presenting a screen shot such as shown in FIG. 4 is entered. A "try again" message or specific animation may be used to indicate to the player that incorrect tracks have been selected. The user is then permitted to return to state 106 where other tracks may be auditioned.

Figure 5:
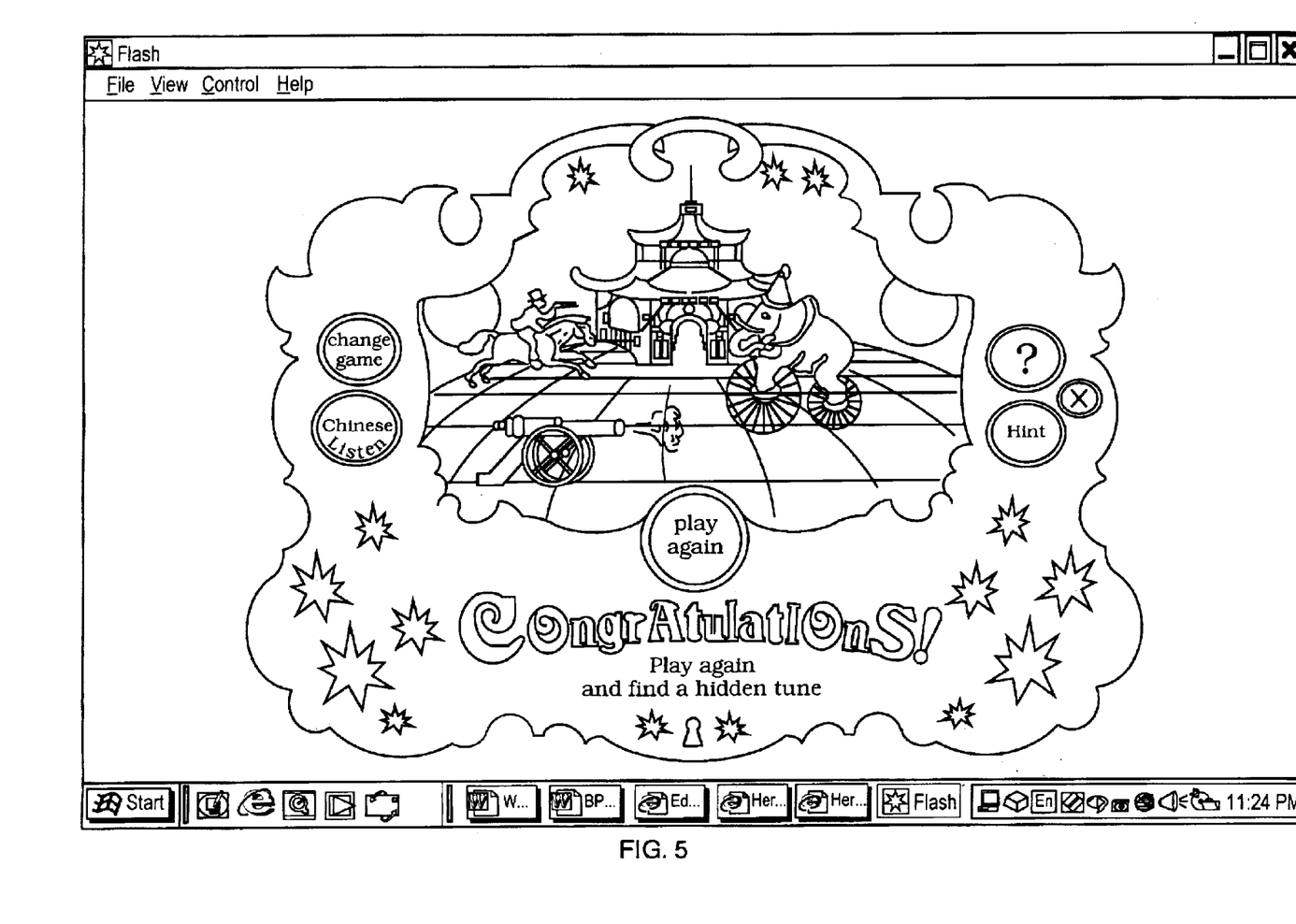
FIG. 5 is a screen shot of what the user sees when all correct tracks are selected.

However, if only the correct tracks are selected then a state 114 is entered in which a screen shot such as that in FIG. 5 is shown. Correct selection of all tracks is indicated to the player in a suitable fashion. For example, all of the animated music characters or instruments may perform the reconstructed song in its entirety according to the original correct score. This screen may have further animation indicating a correct selection with colors, sounds or other moving objects to indicate that the puzzle has been properly solved. At this point the user can either leave the game or choose another song.

More advanced games may be designed in different ways but use the same basic concepts. For example, both the correct and altered tracks are instruments that may be placed within the stage area then play simultaneously. The player may be instructed to extract the incorrect tracks in order to clean up the "mess" on the stage in order to get the song into its original form.

Figure 9:
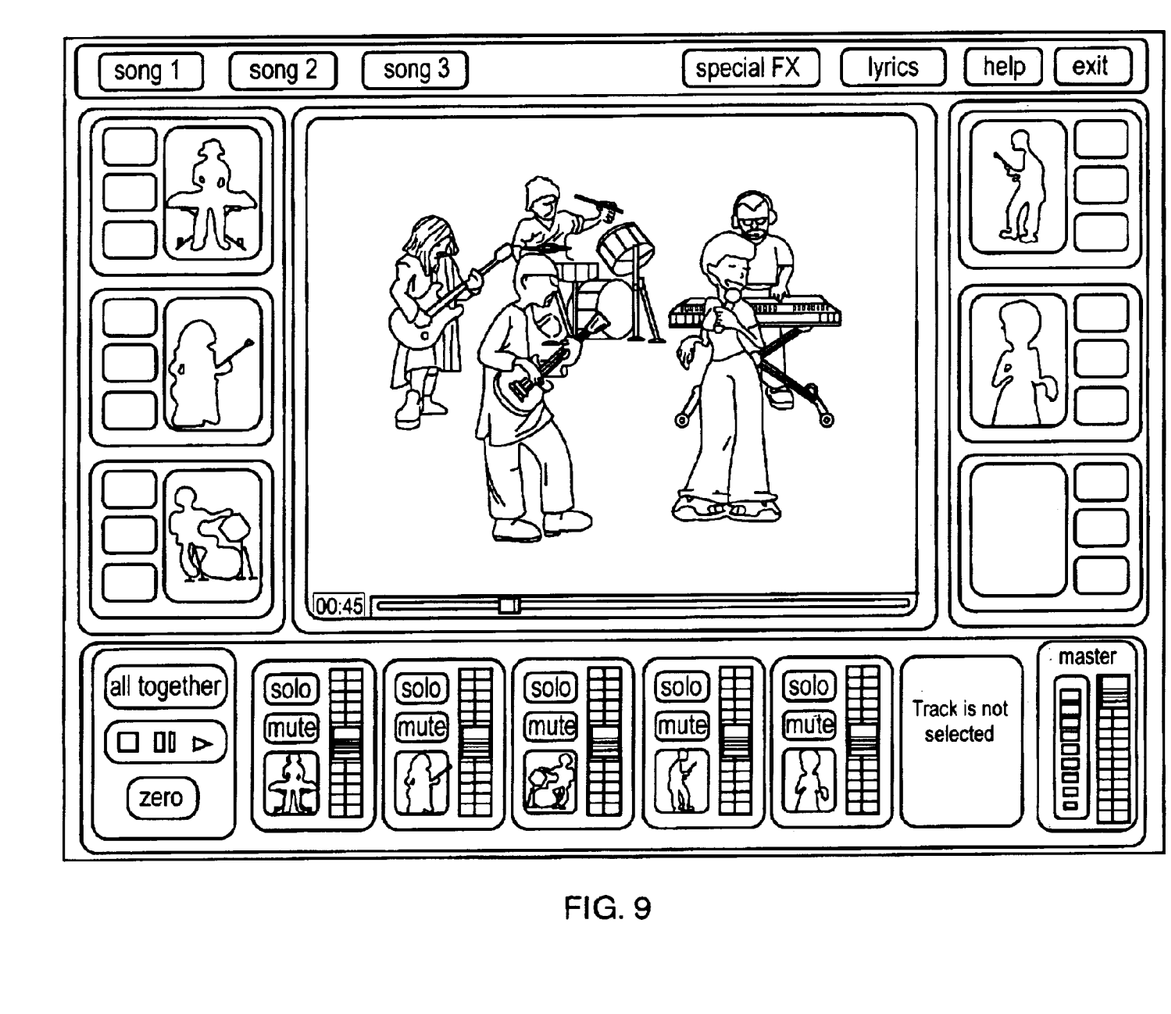
FIG. 9 is a screen shot illustrating another embodiment.

In another variation only the correct instruments are given at the very beginning of the game. However, each instrument may have any number of different tracks. The challenge in this variation is that the player must choose correct tracks which belong to the song in order to solve the puzzle. An example screen shot from this type of game is shown in FIG. 9.

In yet another variation there may be multiple different songs mixed to play on the stage simultaneously. In this game the player has to extract tracks in order to have all songs assembled in their own separate stages.

The basic music puzzle idea thus provides a framework for the creation of interactive entertainment from musical content. In general, the musical content is first split into layers, the segments can be combined with additional set of distractor segments. The distractor segments therefore provide the basis for a game where the user must select the correct original tracks only. The player is required to arrange or assemble the correct tracks in a particular manner in order to complete the music score and win the game.

Figure 6:
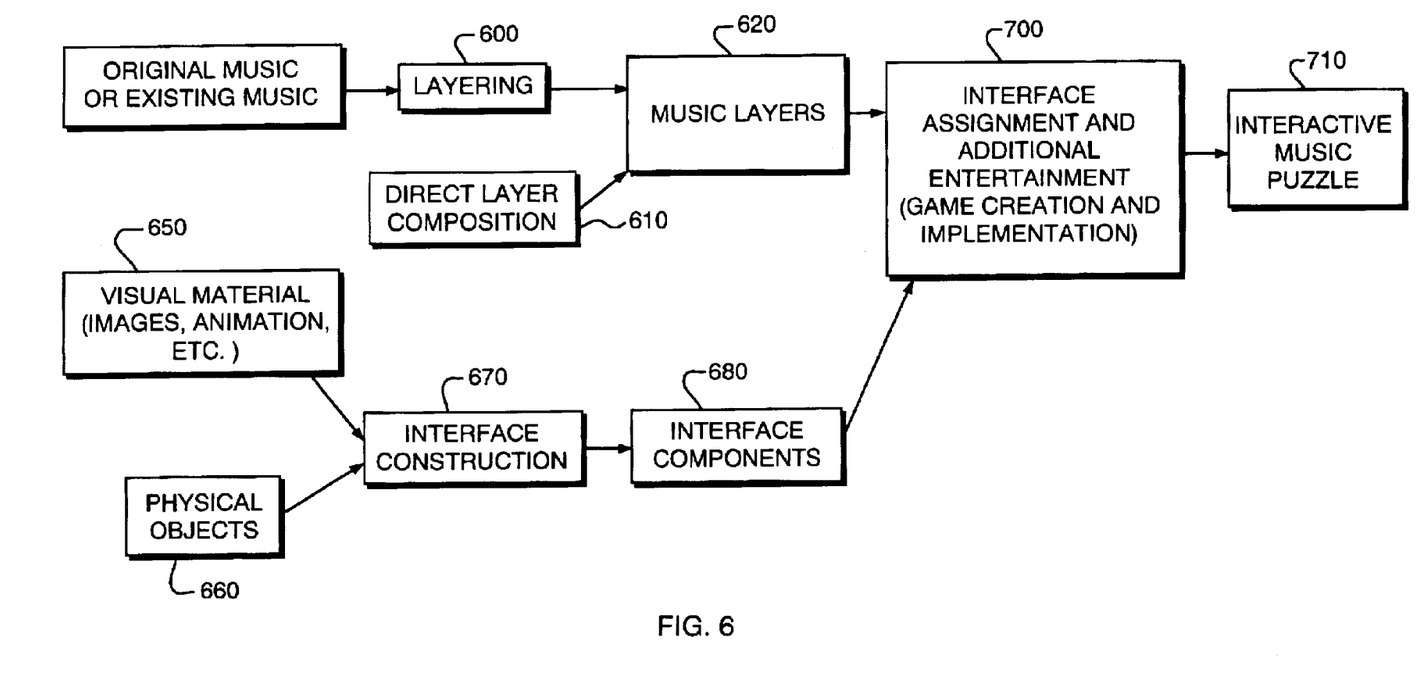
FIG. 6 is a flow diagram illustrating an overview of the puzzle game design process.

It should be understood that design of the game required pre-production of the content that is dividable into three distinct phases. In the first phase, as shown in FIG. 6, the musical content is divided into layers. Here original or existing music is submitted to a layering process 600. This process 600 may include processing any type of musical content such as recorded musical performance, electronically produced music such as by using MIDI or other sequencing technologies or from musical scores other written representations of music that provide for direct layering composition 610.

Music layers 620 may be therefore produced in a number of ways. For example, orchestral music can be divided into layers according to particular instruments.

The layering process 610 may be determined based on one version of the music where all layers are produced from another version. For example, the decisions may be made based upon a score while the audio tracks themselves are taken from a recorded performance.

Another aspect of the design process involves interface construction. Here visual materials 650 such as images or animation as well as physical objects 660 may be provided to an interface construction process. This process produces interface components 680.

The interface components 680 and musical layers 620 are then provided to an interface assignment process 700 that assembles the various components into the interactive music puzzle 710. The visual elements may include buttons, blocks, switches, dials or other standard graphical interface elements but may also include animated or static characters as well as graphical representations of instruments that represent particular music layer 620.

It is possible for the interface assignment process 700 to combine the layers in a variety of ways. It may provide for example synchronized play back of selected music segment. It may also provide the capability to play back the segments in an unsynchronized, or incorrectly synchronized, fashion as a further attribute of the puzzle process.

Figure 7:
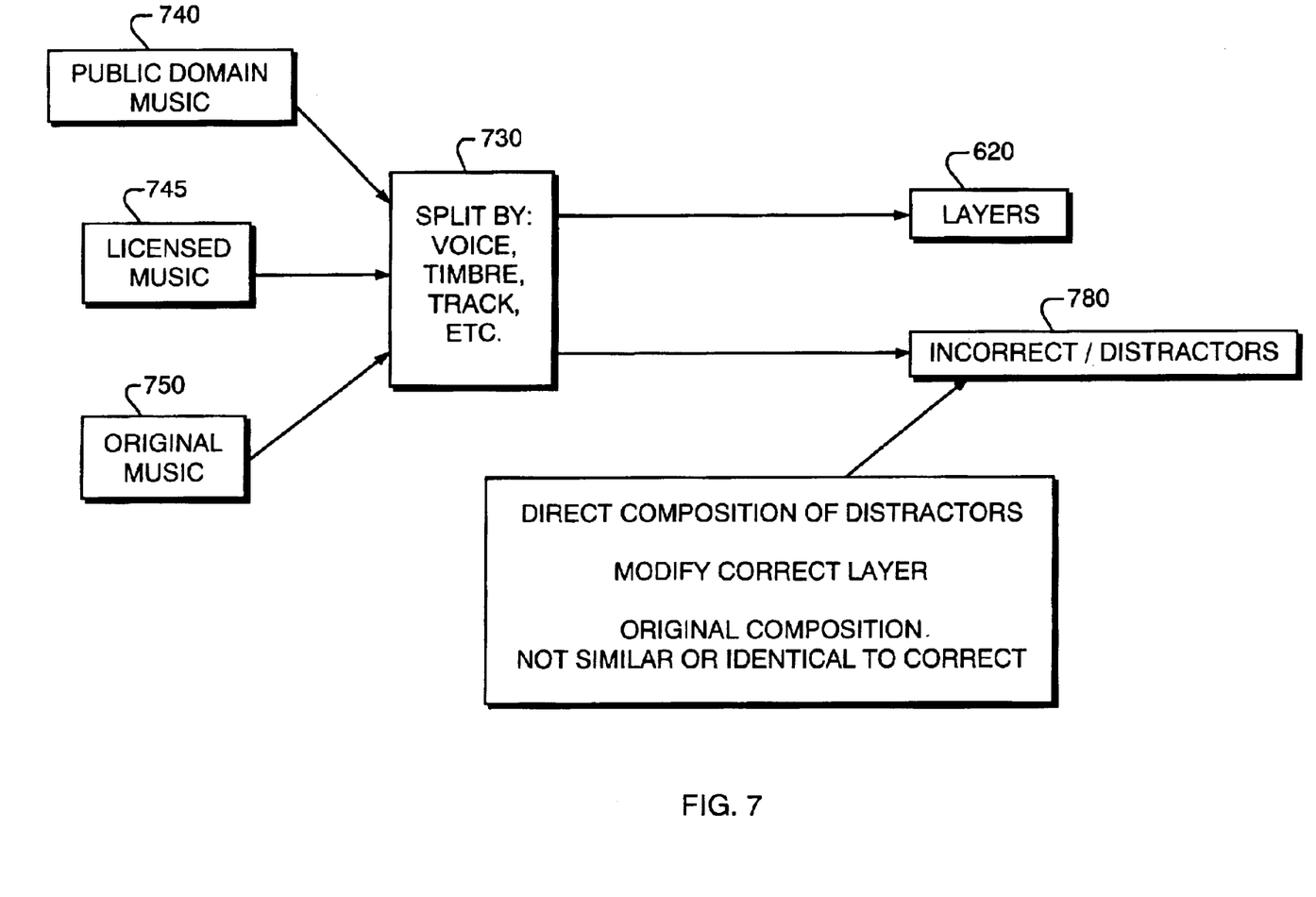
FIG. 7 is a diagram illustrating how music source material may be segmented.

FIG. 7 is a more detailed view of the music layering process 610. More particularly a process 730 may split source music such as public domain music, licensed music 745 or original music 750 in various ways this may include splitting the source music 740, 745 or 750 into music layers 620 by instrument, voice, synthesized timbre or track.

Incorrect distractor layer 780 are also created in this process. These may be created via harmony with other layers such in a way that they are similar to or different from (just not exactly the same as) the correct layers but not identical to them. They may also be created by altering correct layers. These incorrect or distractor layers may or may not fit musically with the other puzzle pieces. These incorrect distractor pieces then taken separately may make up a different complete musical entity that is they can be taken as layers from another complete musical composition or they may themselves be similar to correct layers 620.

Figure 8:
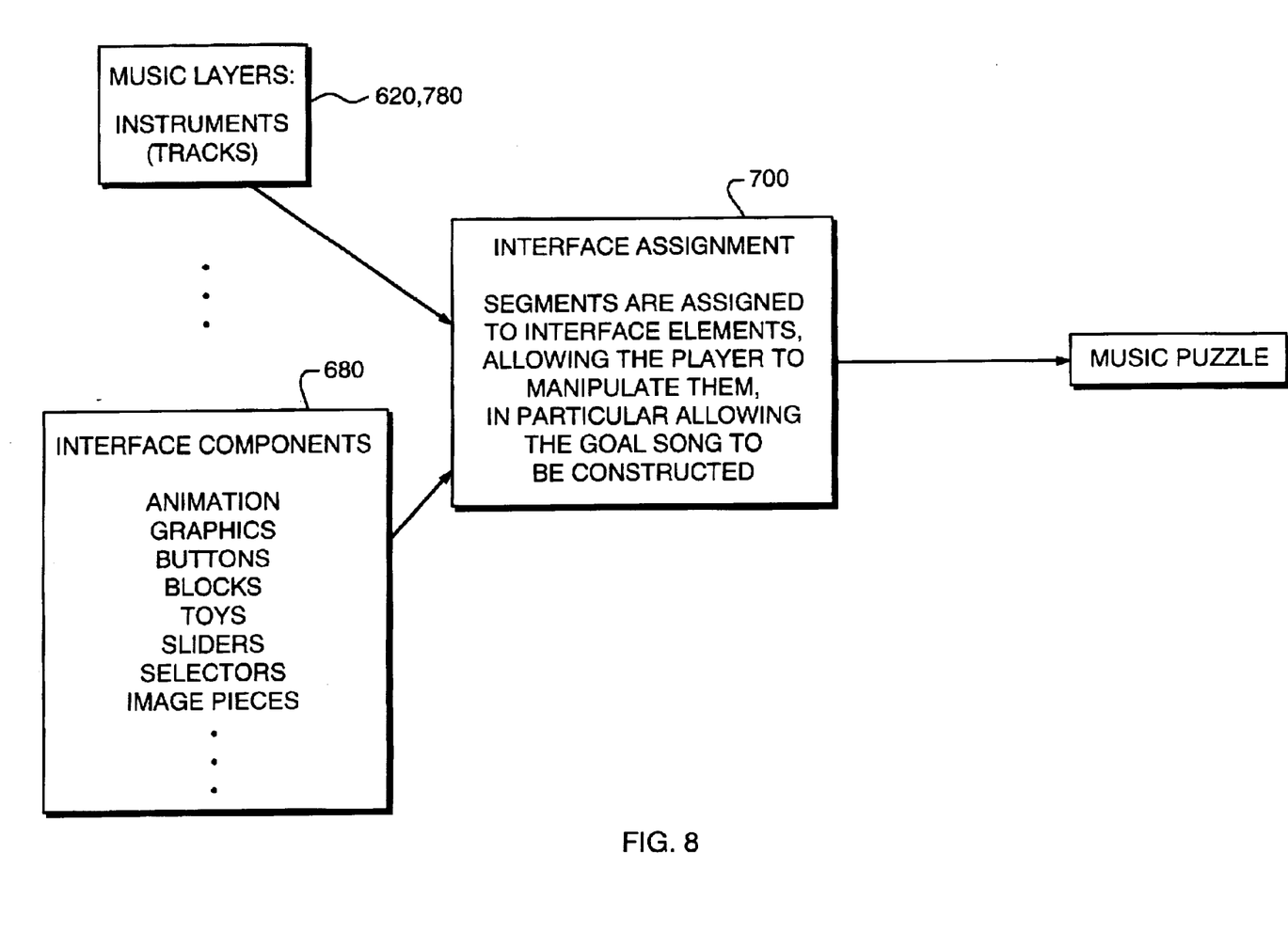
FIG. 8 is a diagram showing how the segments may be assembled into other music puzzle games.

In the interface assignment phase 700 as seen in FIG. 8, the final game is assembled by taking the musical layers 620 or 780 and the interface elements 680 in such a way that layers are assigned to interface elements. Furthermore, program logic is provided to allow the player to manipulate the musical segments according to interaction with the interface elements with the ultimate goal to allow the underlying musical composition to be reconstructed.

The invention thus acts a puzzle having a correct assembly or arrangement of musical segments or a series of correct assemblies or segments. Because the user or player is presented with distractor elements, realization of the correct assembly or arrangement allows the player to participate in a sort of game by correctly selecting them.

The music puzzle also provides for a number of other play features. For example, a number of incorrect assemblies or arrangements of layers provide the player with a novel music experience. As a result the player may explore the way different combinations of segments work together in order to create a particular music experience.

Creative activity is also supported in other ways. For example, the puzzle allows a player flexibility to develop an arrangement or assembly of creative acts such as by selecting only particular layers. The player may then develop other goals for arrangements or assemblies of selected layers.

It is also possible to manipulate the layers in a way that is not relevant to winning the game but allow for greater control over how the resulting music sounds. For example, the player may be permitted to vary the volume of individual layers or their tempo. This may become part of the game, i.e., it may be a goal of the game for the user to also select the proper volume and tempo of individual music pieces in order to arrive at the correct solution.

The interface assignment phase may be used to assign game reactions to the way in which a player manipulates objects. One such example of a manipulation and response was described above in connection with FIGS. 3 and 4.

The invention can be implemented on just about any processor enabled audio device although what was described above was a flash based implementation. For example, any hardware having a mixing and/or sound sequencing capabilities and with the ability to play back stored and computed sounds can be utilized as long as there is also some sort of user interface to allow the player to change the arrangement of selected tracks.

The input selection can be through a set of switches or buttons if not on the keyboard of a computer. Thus, while the implementation described above the selection of segments occurs on a computer monitor through the use of a visual graphical interface and mouse, keyboard, joystick or other input device. However, other sorts of hardware input mechanisms such as switches or buttons could also be used in special purpose hardware.

Other types of distribution channels are also envisioned for the invention. For example, the invention may be distributed as individually purchased copies for particular personal computers such as distributed on CD-ROMS or downloaded from a computer network onto a local hard disk.

However, on-line implementations such as with the illustrated Flash™ environment may also be made available.

The invention may also be implemented as a stand alone electronic toy having appropriate graphical displays or a board game incorporating electronics.

The layers can also be represented by physical objects such as blocks, cards, etc. that are placed into housings in a particular order or arrangement in order to reproduce the correct musical composition.

What is important as the basic elements of the jigsaw music puzzle are that segments are generated from two types of layers, one set correct and one set incorrect. A user interface is provided, allowing a player to select or deselect individual layers. The player then wins a game by selecting the correct layers only to recreate the original music piece.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process comprising:

defining correct audible segments of a source piece, the correct segments representing portions of the source piece;

defining alternative audible segments related to the source piece, the alternative segments not being the same as any correct segments, and serving as distractors; presenting both correct and alternative segments in the same context;

accepting selections of segments from a human of the presented correct and alternative segments;

audibly reproducing the selected combination of the correct and alternative segments as a composition; and presenting an indication of having correctly reconstructed the source piece if only correct segments are in the selected combination.

2. A process comprising:

defining correct audible segments of a source piece, the correct segments representing portions of the source piece;

defining alternative audible segments related to the source piece, the alternative segments not being the same as any correct segments, and serving as distractors;

presenting both correct and alternative segments in the same context;

accepting selections of segments from a human of the presented correct and alternative segments;

audibly reproducing the selected combination of the correct and alternative segments as a composition; and presenting an indication of having incorrectly reconstructed the source music if any alternative segments are chosen in the selected combination.

3. A process as in claim 1 wherein the source piece is music, and the segments are music layers.

4. A process as in claim 1 wherein the layers represent instruments.

5. A process as in claim 1 wherein the source piece includes audio and visual components.

\* \* \* \* \*

UNITED STATES PATENT AND TRADEMARK OFFICE
CERTIFICATE OF CORRECTION

PATENT NO.    : 6,756,534 B2
DATED         : June 29, 2004
INVENTOR(S)   : Alexander Gimpelson et al.

It is certified that error appears in the above-identified patent and that said Letters Patent is hereby corrected as shown below:

<u>Column 8,</u>
Line 15, after the semicolon ";" begin a new paragraph starting with "presenting".
Line 42, from the phrase "are chosen in the selected combination" delete "chosen".

Signed and Sealed this

Thirtieth Day of November, 2004

JON W. DUDAS
*Director of the United States Patent and Trademark Office*